United States Patent
Fairbanks et al.

(10) Patent No.: US 10,063,186 B2
(45) Date of Patent: Aug. 28, 2018

(54) PHASE CHANGE MATERIALS FOR COOLING ENCLOSED ELECTRONIC COMPONENTS, INCLUDING FOR SOLAR ENERGY COLLECTION, AND ASSOCIATED SYSTEMS AND METHODS

(71) Applicant: GlassPoint Solar, Inc., Fremont, CA (US)

(72) Inventors: Dylan Miller Fairbanks, Alameda, CA (US); Peter Emery von Behrens, Menlo Park, CA (US); Hayden Graham Burvill, San Carlos, CA (US); William Durbin, San Jose, CA (US); Chiaki Treynor, Berkeley, CA (US)

(73) Assignee: GlassPoint Solar, Inc., Fremont, CA (US)

(*) Notice: Subject to any disclaimer, the term of this patent is extended or adjusted under 35 U.S.C. 154(b) by 38 days.

(21) Appl. No.: 15/197,177

(22) Filed: Jun. 29, 2016

(65) Prior Publication Data
US 2017/0005615 A1 Jan. 5, 2017

Related U.S. Application Data

(60) Provisional application No. 62/187,171, filed on Jun. 30, 2015.

(51) Int. Cl.
*F24J 2/34* (2006.01)
*H01L 31/042* (2014.01)
(Continued)

(52) U.S. Cl.
CPC ........ *H02S 40/425* (2014.12); *E21B 43/2406* (2013.01); *F24F 5/0021* (2013.01);
(Continued)

(58) Field of Classification Search
CPC ....... F24J 2/12; F24J 2/505; F24J 2/38; H02S 50/00; H02S 40/425; F24F 5/0021; E21B 43/2406
(Continued)

(56) References Cited

U.S. PATENT DOCUMENTS

| 1,240,890 A | 9/1917 | Shuman et al. |
| 2,217,593 A | 10/1940 | London |

(Continued)

FOREIGN PATENT DOCUMENTS

| CN | 86205939 | 9/1987 |
| CN | 2050918 | 1/1990 |

(Continued)

OTHER PUBLICATIONS

International Search Report and Written Opinion for International Patent Application No. PCT/US16/40121, Applicant: Glasspoint Solar, Inc., dated Oct. 12, 2016, 11 pages.

(Continued)

*Primary Examiner* — Angelo Trivisonno
(74) *Attorney, Agent, or Firm* — Perkins Coie LLP (57) ABSTRACT

The present technology is directed generally to phase change materials for cooling enclosed electronic components, including for solar energy collection, and associated systems and methods. In particular embodiments, a system directs warm air through an airflow path in thermal communication with a phase change material to liquefy the phase change material and cool the air. The system also directs the cool air into thermal communication with electronic components to cool the electronic components via conduction and/or convection.

10 Claims, 7 Drawing Sheets

(51) Int. Cl.
*H02N 6/00* (2006.01)
*H02S 40/42* (2014.01)
*E21B 43/24* (2006.01)
*F24F 5/00* (2006.01)
*F24J 2/50* (2006.01)
*H02S 50/00* (2014.01)
*F24J 2/46* (2006.01)
*F24J 2/54* (2006.01)

(52) U.S. Cl.
CPC ............ *F24J 2/4625* (2013.01); *F24J 2/505* (2013.01); *F24J 2/54* (2013.01); *H02S 50/00* (2013.01); *F24J 2002/5434* (2013.01)

(58) Field of Classification Search
USPC ........................................................ 126/618
See application file for complete search history.

(56) References Cited

U.S. PATENT DOCUMENTS

| | | |
|---|---|---|
| 2,221,919 A | 11/1940 | Kenan |
| 2,859,745 A | 11/1958 | von Brudersdorff |
| 3,672,572 A | 6/1972 | Delfs |
| 3,847,136 A | 11/1974 | Salvail |
| 3,923,039 A | 12/1975 | Falbel |
| 3,991,740 A | 11/1976 | Rabl |
| 3,994,279 A | 11/1976 | Barak |
| 3,996,917 A | 12/1976 | Trihey |
| 4,003,366 A | 1/1977 | Lightfoot |
| 4,015,585 A | 4/1977 | Fattor |
| 4,044,752 A | 8/1977 | Barak |
| 4,071,016 A | 1/1978 | Henderson |
| 4,071,017 A | 1/1978 | Russell, Jr. et al. |
| 4,078,549 A | 3/1978 | McKeen et al. |
| 4,083,155 A | 4/1978 | Lampert |
| 4,088,116 A | 5/1978 | Pastor |
| 4,095,369 A | 6/1978 | Posnansky et al. |
| 4,099,515 A | 7/1978 | Schertz |
| 4,143,233 A | 3/1979 | Kapany et al. |
| 4,149,523 A | 4/1979 | Boy-Marcotte et al. |
| 4,174,752 A | 11/1979 | Slater et al. |
| 4,184,482 A | 1/1980 | Cohen |
| 4,209,222 A | 6/1980 | Posnansky |
| 4,210,463 A | 7/1980 | Escher |
| 4,213,448 A * | 7/1980 | Hebert .................. F24J 2/0444 126/400 |
| 4,219,008 A | 8/1980 | Schultz |
| RE30,407 E | 9/1980 | Lightfoot |
| 4,226,502 A | 10/1980 | Gunzler |
| 4,237,864 A | 12/1980 | Kravitz |
| 4,239,033 A | 12/1980 | Matkovits |
| 4,249,340 A | 2/1981 | Maes, Jr. |
| 4,259,401 A * | 3/1981 | Chahroudi .............. E04C 1/392 126/618 |
| 4,263,893 A | 4/1981 | Pavlak et al. |
| 4,274,394 A | 6/1981 | Stromberg |
| 4,280,480 A | 7/1981 | Raposo |
| 4,287,880 A | 9/1981 | Geppert |
| 4,321,909 A | 3/1982 | Trihey |
| 4,323,052 A | 4/1982 | Stark |
| 4,333,447 A | 6/1982 | Lemrow et al. |
| 4,370,974 A | 2/1983 | Maxey |
| 4,371,623 A | 2/1983 | Taylor |
| 4,372,386 A | 2/1983 | Rhoades et al. |
| 4,386,600 A | 6/1983 | Eggert, Jr. |
| 4,401,103 A | 8/1983 | Thompson |
| 4,410,156 A | 10/1983 | Pischzik et al. |
| 4,423,719 A | 1/1984 | Hutchison |
| 4,427,838 A | 1/1984 | Goldman |
| 4,436,084 A | 3/1984 | Carlston et al. |
| 4,462,390 A | 7/1984 | Holdridge et al. |
| 4,484,568 A | 11/1984 | Witt |
| 4,493,313 A | 1/1985 | Eaton |
| 4,508,101 A * | 4/1985 | Carter .................. C09K 5/063 126/400 |
| 4,727,854 A | 3/1988 | Johnson |
| 4,741,161 A | 5/1988 | Belart et al. |
| 5,048,507 A | 9/1991 | Ridett |
| 5,191,876 A | 3/1993 | Atchley |
| 5,258,101 A | 11/1993 | Breu |
| 5,365,920 A | 11/1994 | Lechner |
| 5,460,163 A | 10/1995 | Goebel |
| 5,520,747 A | 5/1996 | Marks |
| 5,699,785 A | 12/1997 | Sparkman |
| 5,851,309 A | 12/1998 | Kousa |
| 6,220,339 B1 | 4/2001 | Krecke |
| 6,485,152 B2 | 11/2002 | Wood |
| 6,953,038 B1 | 10/2005 | Nohrig |
| 6,994,082 B2 | 2/2006 | Hochberg et al. |
| 7,055,519 B2 | 6/2006 | Litwin |
| 7,432,488 B1 | 10/2008 | Hines et al. |
| 7,490,381 B1 | 2/2009 | Franzino |
| 7,748,137 B2 | 7/2010 | Wang |
| 7,858,875 B2 | 12/2010 | Lu |
| 7,975,686 B2 | 7/2011 | Prueitt |
| 7,992,553 B2 | 8/2011 | Le Lievre |
| 8,056,555 B2 | 11/2011 | Prueitt |
| 8,119,963 B2 | 2/2012 | Scanlon |
| 8,153,944 B2 | 4/2012 | Hines et al. |
| 8,207,482 B2 | 6/2012 | Rosa |
| 8,256,413 B2 | 9/2012 | Koetter et al. |
| 8,274,028 B2 | 9/2012 | Needham |
| 8,333,186 B2 | 12/2012 | Jennings |
| 8,397,434 B2 | 3/2013 | Bayne |
| 8,511,298 B2 | 8/2013 | Ven |
| 8,701,773 B2 | 4/2014 | O'Donnell et al. |
| 8,739,774 B2 | 6/2014 | O'Donnell et al. |
| 8,748,731 B2 | 6/2014 | MacGregor et al. |
| 8,752,542 B2 | 6/2014 | O'Donnell et al. |
| 8,887,654 B2 | 11/2014 | Hoefler |
| 8,915,244 B2 * | 12/2014 | von Behrens ............ F24J 2/541 126/692 |
| 9,033,528 B2 | 5/2015 | Stoeger et al. |
| 9,035,168 B2 | 5/2015 | Barton |
| 9,127,822 B2 | 9/2015 | Hutson et al. |
| 9,182,470 B2 | 11/2015 | Heckendorn |
| 9,268,069 B2 | 2/2016 | Boeman |
| 9,405,091 B2 | 8/2016 | Boeman |
| 9,447,989 B2 | 9/2016 | Tiefenbacher et al. |
| 9,780,722 B1 | 10/2017 | Wik |
| 2001/0008144 A1 | 7/2001 | Uematsu et al. |
| 2003/0188477 A1 | 10/2003 | Pasternak et al. |
| 2004/0031517 A1 | 2/2004 | Bareis |
| 2004/0055594 A1 | 3/2004 | Hochberg et al. |
| 2007/0056726 A1 | 3/2007 | Shurtleff |
| 2007/0240704 A1 | 10/2007 | Prueitt |
| 2008/0163864 A1 | 7/2008 | Larson |
| 2008/0216822 A1 | 9/2008 | Lazzara et al. |
| 2008/0308094 A1 | 12/2008 | Johnston |
| 2009/0014156 A1 * | 1/2009 | Vetrovec .................. F28D 15/00 165/104.31 |
| 2009/0056698 A1 | 3/2009 | Johnson et al. |
| 2009/0056699 A1 | 3/2009 | Mills et al. |
| 2009/0179139 A1 | 7/2009 | Hines et al. |
| 2009/0223510 A1 | 9/2009 | Larsen |
| 2009/0260359 A1 | 10/2009 | Palkes |
| 2010/0043779 A1 | 2/2010 | Ingram |
| 2010/0051016 A1 | 3/2010 | Ammar |
| 2010/0051021 A1 | 3/2010 | Kunz |
| 2010/0065045 A1 | 3/2010 | Jennings |
| 2010/0091396 A1 | 4/2010 | Hutson et al. |
| 2010/0186733 A1 | 7/2010 | Hoefler |
| 2010/0229851 A1 | 9/2010 | Reynolds |
| 2010/0275902 A1 | 11/2010 | Falbel |
| 2011/0048405 A1 | 3/2011 | Koetter et al. |
| 2011/0073161 A1 | 3/2011 | Scanlon |
| 2011/0088686 A1 | 4/2011 | Hochberg et al. |
| 2011/0100355 A1 | 5/2011 | Pedretti |
| 2011/0108092 A1 | 5/2011 | Le Lievre et al. |
| 2011/0114079 A1 | 5/2011 | Heckendorn |
| 2011/0114083 A1 | 5/2011 | Pedretti |
| 2011/0126824 A1 | 6/2011 | Conlon et al. |
| 2011/0174935 A1 | 7/2011 | Bingham et al. |
| 2011/0220092 A1 | 9/2011 | Ven |

(56) References Cited

U.S. PATENT DOCUMENTS

| | | |
|---|---|---|
| 2011/0232633 A1 | 9/2011 | Lima |
| 2011/0291405 A1 | 12/2011 | Burger et al. |
| 2011/0308512 A1 | 12/2011 | Nakasato et al. |
| 2012/0067337 A1 | 3/2012 | Hall et al. |
| 2012/0152307 A1 | 6/2012 | MacGregor et al. |
| 2012/0167873 A1 | 7/2012 | Venetos et al. |
| 2012/0180845 A1 | 7/2012 | Cole et al. |
| 2012/0234311 A1 | 9/2012 | Johnson et al. |
| 2012/0235017 A1 | 9/2012 | Scanlon et al. |
| 2012/0255309 A1 | 10/2012 | Venetos et al. |
| 2013/0087316 A1 | 4/2013 | Goenka |
| 2013/0092153 A1 | 4/2013 | O'Donnell et al. |
| 2013/0118099 A1 | 5/2013 | Scanlon |
| 2014/0069416 A1 | 3/2014 | von Behrens |
| 2014/0123646 A1 | 5/2014 | Muren et al. |
| 2014/0182654 A1 | 7/2014 | Agullo |
| 2014/0326234 A1 | 11/2014 | O'Donnell et al. |
| 2014/0347757 A1 | 11/2014 | MacGregor et al. |
| 2015/0135743 A1 | 5/2015 | Dobbs |
| 2015/0144125 A1 | 5/2015 | von Behrens |
| 2015/0378140 A1 | 12/2015 | Hutson et al. |
| 2017/0003054 A1 | 1/2017 | Farver et al. |

FOREIGN PATENT DOCUMENTS

| | | |
|---|---|---|
| CN | 2926930 | 7/2007 |
| CN | 200958464 Y | 10/2007 |
| CN | 201003842 Y | 1/2008 |
| CN | 201059795 | 5/2008 |
| CN | 201119328 Y | 9/2008 |
| CN | 101292011 | 10/2008 |
| CN | 101354191 | 1/2009 |
| CN | 101363958 A | 2/2009 |
| CN | 201359397 Y | 12/2009 |
| DE | 2635423 A1 | 2/1978 |
| DE | 3014445 A1 | 10/1981 |
| DE | 102004013590 A1 | 10/2005 |
| DE | 202005021000 U1 | 1/2007 |
| DE | 102008037711 | 2/2010 |
| EP | 0506568 A1 | 9/1992 |
| EP | 0946432 B1 | 1/2001 |
| EP | 988493 B1 | 8/2003 |
| FR | 2274879 A1 | 1/1976 |
| FR | 2696753 A1 | 4/1994 |
| FR | 2901838 A1 | 12/2007 |
| GB | 1563655 | 3/1980 |
| KR | 20080024309 | 3/2008 |
| SU | 1657893 A1 | 6/1991 |
| WO | WO-2007146183 A2 | 12/2007 |
| WO | WO-2008153922 A1 | 12/2008 |
| WO | WO-2009002772 A2 | 12/2008 |
| WO | WO-2010032095 A2 | 3/2010 |
| WO | WO-2010040957 A2 | 4/2010 |
| WO | WO-2010043744 A2 | 4/2010 |
| WO | WO-2011053863 A2 | 5/2011 |
| WO | WO-2014065938 A1 | 5/2014 |

OTHER PUBLICATIONS

Adventures in Energy, "Extracting Oil and Natural Gas." 1 pp., accessed Oct. 7, 2013.

Adventures in Energy, "Separating Oil, Natural Gas and Water." 1 page, accessed Oct. 7, 2013.

Bierman et al "Performance of Enclosed Trough Otsg for Enhanced Oil Recovery," SolarPaces 2013, 11 pages.

Bierman et al "Solar Enhanced Oil Recovery Plant in South Oman," SolarPaces 2013; 10 pages.

BrightSource Limitless, "Coalinga Project Facts, a BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.

BrightSource Limitless, "Enhanced Oil Recovery Project—Coalinga," accessed Sep. 19, 2013, http://www.brightsourceenergy.com/coalinga, 2 pages.

Champion Technologies, "Enhanced Oil Recovery." 2 pages, accessed Oct. 7, 2013.

Proz, 'on the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of manufacturing_tolerance.html>.

The Linde Group, "Enhanced Oil Recovery (EOR)", 1 page, accessed Oct. 7, 2013.

Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askascl/eng99/eng99556.htm>.

* cited by examiner

PHASE CHANGE MATERIALS FOR COOLING ENCLOSED ELECTRONIC COMPONENTS, INCLUDING FOR SOLAR ENERGY COLLECTION, AND ASSOCIATED SYSTEMS AND METHODS

CROSS-REFERENCE TO RELATED APPLICATION

The present application claims priority to U.S. Provisional Application No. 62/187,171, filed Jun. 30, 2015, which is incorporated herein by reference. To the extent the foregoing application and/or any other materials incorporated herein by reference conflict with the present disclosure, the present disclosure controls.

TECHNICAL FIELD

The present technology is directed to phase change materials for cooling enclosed electronic components, including for solar energy collection, and associated systems and methods.

BACKGROUND

The swath of desert stretching from the Atlantic Ocean to North Africa, the Arabian Peninsula, the Middle East, and the Persian Gulf has vast amounts of solar energy along with warm weather. The average daily high temperatures in these regions range from 43° C. to 49° C. in the summer, with some of hottest days having temperatures over 53° C. Additionally, large parts of the United States for collecting solar energy such as the Mojave Desert and Great Basin Desert have summer daily high temperatures from 35° C. to 49° C.; some summer days have temperatures higher than 49° C.

As a result of the warm weather in these and similar regions, challenges arise because the heat can disrupt solar collection processes or equipment. For example, heat can cause equipment to malfunction or fail. Although standard air conditioning systems are one solution for cooling equipment, it can be difficult to set up air conditioning systems in high ambient temperature environments due to operating temperature limits, or remote locations such as deserts because of lack of a power and/or resources to build and maintain these systems. Moreover, the additional power required to operate air conditioning systems is generally adverse to, and may even defeat the purpose of, gathering and converting solar energy. Accordingly, there remains a need for systems and methods for cooling equipment in a solar environment.

DETAILED DESCRIPTION

One system for collecting solar energy can include a solar collection structure. A solar collection structure can in turn include a glasshouse used to house solar collection equipment such as a solar concentrator, a photovoltaic cell, and/or electronic components (e.g., an electric panel) associated with controlling and monitoring equipment in a solar field. The solar collection structure can protect the solar collection equipment from wind, dust, dirt, contaminants, and/or other potentially damaging or obscuring elements that may be present in the exterior environment. At the same time, the solar collection structure can include transmissive surfaces (e.g., glass walls and/or roof) to allow solar radiation to pass into the interior of the solar collection structure. A potential drawback with this approach is that the solar collection structure can trap heat because transmissive surfaces can behave as insulation to retain heat in the solar collection structure. Furthermore, electronic components inside the solar collection structure (and other equipment such as motors or power inverters) generate heat themselves, which can add to the challenge of maintaining a target operational temperature within the solar collection structure. For example, temperatures inside a solar collection structure can reach above 65° C. (and even 75° C. or higher) during the daytime in summer months.

Solar collection equipment and electronic components inside the solar collection structure are susceptible to damage from heat, and can be affected by the resulting high temperatures. For example, solar collection equipment and electronic components may experience performance failure or malfunction, or direct physical damage, in the presence of high temperatures. The failure or malfunction of solar collection equipment and/or electronic components, such as the failure of control units, electrical panels, and/or actuators that control a solar concentrator, may result in losses of solar energy collection and energy production. Furthermore, equipment failure is costly in terms of production/profit losses and repairing or replacing the affected equipment. Alternatively, if the performance of the equipment is degraded or de-rated at high temperatures, the manufacturer may need to install more expensive (e.g., larger) equipment to overcome loss of performance, which also reduces economic efficiency.

The present technology is directed generally to systems and methods for cooling electronic components, and in particular embodiments, components used to control solar energy collection equipment in a protective environment. In particular embodiments, the system directs warm air through an airflow path in thermal communication with a phase change material to liquefy the phase change material and cool the air. The system can then direct the cooled air along the airflow path in thermal communication with electronic components inside an enclosure to cool the electronic components via conduction and/or convection.

In some embodiments, the system includes an enclosure (also referred to as an "electronics enclosure"). The enclosure can include a structure having a first portion enclosing the electronic components and a second portion enclosing the phase change material. The enclosure can also include an airflow path in thermal communication with the electronic components in the first portion and the phase change material in the second portion. Additionally, the enclosure can include an actuatable component (e.g., a door, vent, flap, and/or valve) to control the flow of air along the airflow path and to allow air surrounding the enclosure to enter or exit.

In a representative use of the system, the enclosure is positioned inside a solar collection structure at a solar field. The solar collection structure includes solar collection equipment (e.g., a receiver conduit and/or a solar concentrator) and electronic components for operating and/or monitoring the solar collection equipment. The electronic components are positioned inside the enclosure. During the daytime, the temperature inside the solar collection structure will increase due to solar radiation entering the structure, heat being trapped inside the structure, and an increase in the exterior temperature of the structure. In addition, the electronic components inside the enclosure will heat up because the components themselves generate heat.

To cool the electronic components during the daytime, the system can direct air into thermal communication with a phase change material (e.g., paraffin wax). As the air temperature inside the enclosure increases, the phase change material absorbs heat as sensible heat (e.g., by changing its temperature but not its state) until it reaches its melting point. Once at its melting point, the phase change material absorbs heat as latent heat, which can be a large amount of thermal energy (e.g., 90 kJ/kg to 450 kJ/kg or more). In other words, as the air temperature rises inside the enclosure during the daytime, the phase change material heats up until it melts; when the phase change material melts, it removes a large amount of heat from the air inside the enclosure, which cools both the air and the electronic components inside the enclosure.

At night, the exterior air temperature will typically decrease. At that time, the system can open the enclosure and direct relatively cool air from outside the enclosure into thermal communication with the interior of the enclosure. As a result of this temperature difference, the cooler air that is directed into thermal communication with the phase change material will solidify the phase change material. In general, the cycle of opening and closing the enclosure to direct airflow can be repeated to regulate the temperature of the air inside the enclosure and, in turn, regulate (e.g., cool) the temperature of the electronic components.

Aspects of the present technology can improve upon existing techniques in one or more of several areas. For example, the system reduces the temperature of electronics (e.g., an electrical panel and/or power converter), used to operate solar collection equipment, which reduces the risk of electronic component failure and damage. This approach can be less expensive compared to using air conditioning or electronic components designed to withstand extremely high temperatures. Further, systems in accordance with particular embodiments can be easily maintained and/or repaired because the systems can include only a few moving parts (e.g., opening and closing doors and/or a fan).

Specific details of several embodiments of the disclosed technology are described below with reference to systems configured for collecting solar energy. In particular embodiments, the incident solar radiation is used to heat a working fluid, although in other embodiments, the radiation can impinge on solar cells (e.g., photovoltaic (PV) cells) for direct conversion to electricity. Moreover, several other embodiments of the technology can have configurations and/or components different than those described in this section. Also, although specific details of several embodiments of the disclosed technology are described below with reference to a system configured for collecting solar energy in a solar field, in other embodiments, the present technology can be used in other processes (e.g., chemical, recycling, and/or biomass processes).

Several embodiments of the presently disclosed technology described below may take the form of computer-executable instructions, including routines executed by a programmable computer and/or other controller. Those skilled in the relevant art will appreciate that the technology can be practiced on or by computer systems and/or controllers other than those shown and described below. The technology can be embodied in a special-purpose computer or data processor that is specifically programmed, configured, and/or constructed to perform one or more of the computer-executable instructions described below. Accordingly, the terms "computer" and "controller" as generally used herein refer to any suitable data processor and can include internet appliances and hand-held devices (including multi-processor systems, processor-based or programmable electronics, network computers, minicomputers, and the like).

Solar Collection Structure

Figure 1:
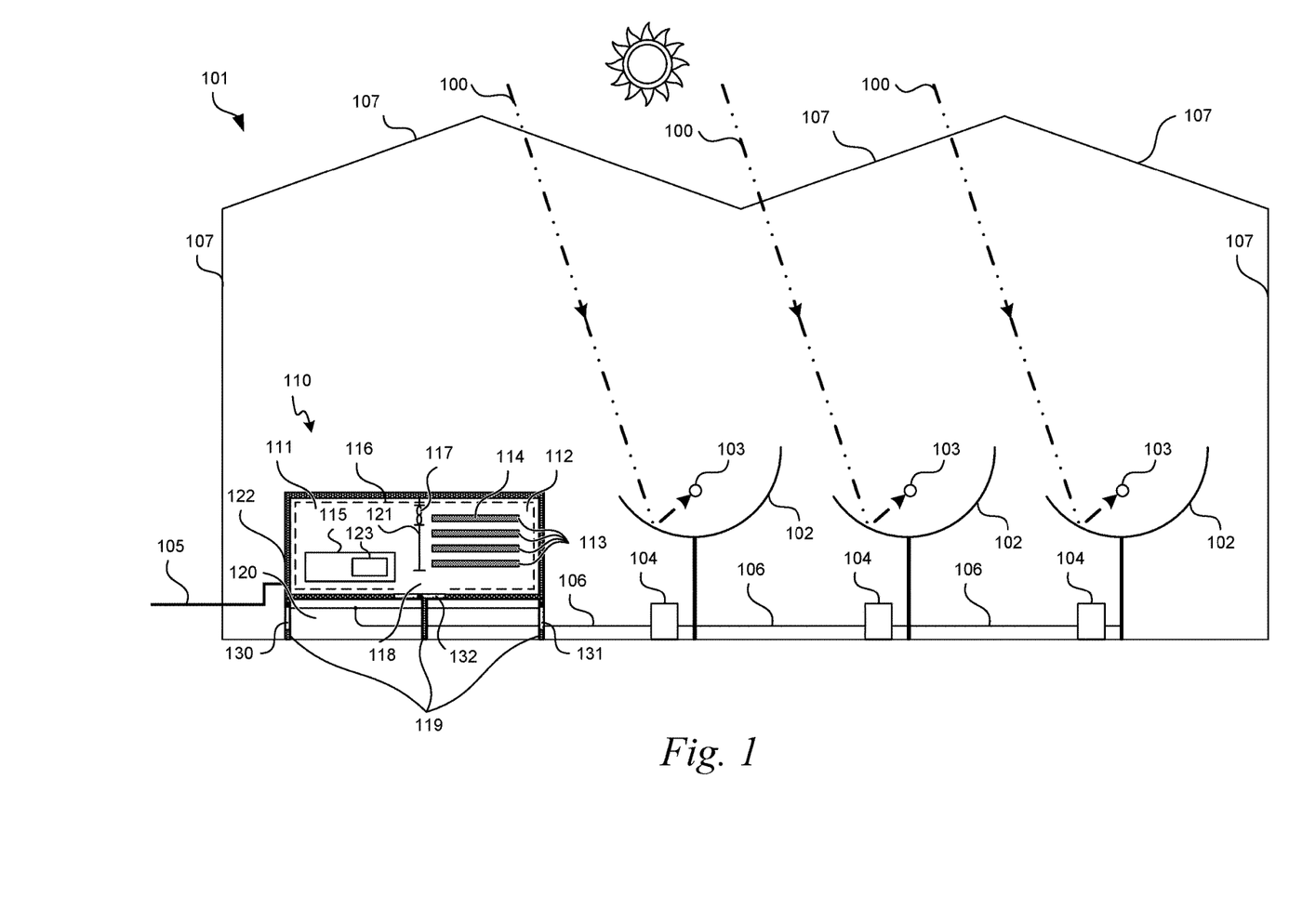
FIG. 1 is a partially schematic end view of a solar collection structure with an internal electronics enclosure configured in accordance with embodiments of the present technology.

FIG. 1 is a partially schematic end view of a solar collection structure 101 having an internal electronics enclosure 110 configured in accordance with embodiments of the present technology. As shown in FIG. 1, the solar collection structure 101 houses the electronics enclosure 110, a plurality of solar concentrators 102 coupled to actuators 104, receivers 103, an electrical conduit 106 for electrical communication and power transfer, and a power line 105 to receive power at the solar collection structure 101. In operation, solar radiation 100 enters the solar collection structure 101 through light-transmissive surfaces 107. After the solar radiation 100 enters the solar collection structure 101, the plurality of solar concentrators 102 focus incoming solar radiation 100 on corresponding receivers 103 (e.g., elongated conduits or pipes) to heat a fluid inside the receivers 103. The heated fluid can be used to generate steam, or the thermal energy in the fluid can be converted to another form of energy (e.g., electrical energy). In particular embodiments, the steam is used to remove underground oil in an enhanced oil recovery (EOR) operation.

With continued reference to FIG. 1, the illustrated solar concentrators 102 are line-focus reflectors that receive the solar radiation 100 and concentrate the solar radiation 100 along a focal line. The receivers 103 are positioned along the focal lines to receive the concentrated solar radiation 100. The actuators 104 optionally rotate the solar concentrators 102 around the corresponding focal lines to track the daily and/or seasonal movement of the sun, which increase the total amount of captured and converted energy. In other embodiments, the solar concentrators can have other configurations (e.g., point source concentrators, Fresnel concentrators, and others) as described in U.S. Pat. No. 8,748,731, incorporated herein by reference. As shown in FIG. 1, the power line 105 can provide electric power (e.g., alternating current (AC)) to the actuators 104 to move the solar concentrators 102. In a particular embodiment, the power line 105 may carry AC power to a power inverter (e.g., AC-DC) inside the electronics enclosure 110, the resulting DC power is direct to the actuators 104 via the electrical conduit 106.

The receiver 103 operates as a light-to-heat transducer. The receiver 103 absorbs solar energy, transforming it to heat and transmitting the heat to a thermal transport medium such as water, steam, oil, or molten salt. Accordingly, the receiver 103 can be a pipe or conduit. Representative arrangements for supporting the receiver 103 and the solar concentrator 102 are described further in U.S. Pat. No. 8,915,244, incorporated herein by reference.

As shown schematically in FIG. 1, the electronics enclosure 110 is positioned inside the solar collection structure 101, e.g., above the bottom of the solar collection structure 101 (in a particular embodiment 0.5 meter above the bottom). The electronics enclosure 110 can be supported by three legs 119 to allow air to flow beneath the electronics enclosure 110. An exterior 122 of the electronics enclosure 110 can be composed of a metal such as steel, aluminum, or a combination thereof. The electronics enclosure 110 can include an insulation material 116, e.g., on the interior of the electronics enclosure 110.

The insulation material 116 can include fiberglass, mineral wool, cellulose, plastic, polystyrene, and/or another suitable polymer materials. The insulation material 116 can be moisture resistant to decrease the degradation of the insulation material during operation. One benefit of positioning the insulation material 116 on the interior of the electronics enclosure 110 is that it reduces the amount of moisture that comes in contact with the insulation material 116 as compared to placing the insulation material 116 on the exterior wall 122 of the electronics enclosure 110, as the latter environment can have a higher moisture content.

As shown schematically in FIG. 1, electronic components 115 can be housed inside the electronics enclosure 110, e.g., at first portion 111. The electronic components 115 can be used to operate or monitor a solar collection process. Representative examples of electronic components 115 are controllers, microcontrollers, processors, alternating current to direct current (AC-DC) converters, computer-readable media storing algorithms for operating controllers, thermocouples, sensors (e.g., temperature and/or humidity), electrical panels, printed circuit boards, and/or other electrical circuits. In a particular example, the electronic components 115 can be used to direct the actuators 104 to rotate the solar concentrators 102.

In some embodiments, the electronic components 115 include a controller 123 that controls the one or more actuatable components (shown as actuatable components 130-131) and/or other components within the solar collection structure 101. Although the electronic components 115 and/or controller 123 are shown as being inside the electronics enclosure 110 (e.g., in the first portion 111), in some embodiments, the controller 123 can be positioned outside the electronics enclosure 110 (e.g., attached to a leg 119). The controller 123 can include or be coupled to a memory storing instructions for controlling the actuatable components 130-132. The actuatable components 130-132 and an air duct 120 can be used to direct air into the electronics enclosure 110 or reduce the amount of air entering the electronics enclosure 110. The actuatable components 130-132 can include doors, vents, valves, and/or flaps configured to move based on signals from the controller 123.

In the configuration shown in FIG. 1, the actuatable components 130-132 are closed, meaning that the actuatable components are in a position to at least reduce (e.g., hinder or block) the flow of air into the electronics enclosure 110. The position of the actuatable components is changeable, meaning that the actuatable components can change in position, shape, and/or configuration. For example, if the actuatable components 130-132 are doors, they can move between open and closed positions to increase or decrease the flow of air into or out of the electronics enclosure 110. As described in more detail in FIGS. 2A and 2B, the actuatable components 130-132 can be configured to move between a first position that allows (e.g., increases) air flow into the electronics enclosure 110 and a second position that reduces (e.g., prevents) air from entering the electronics enclosure 110. In other embodiments, the actuatable components can be valves, or other devices, configured to move between open and closed configurations. The air duct 120 is an optional element that can form part of an airflow path to direct air in and out of the electronics enclosure 110, which can be regulated the actuatable components 130-132.

The electronics enclosure 110 can include a second portion 112 that houses a phase change material 114. The phase change material 114 is a substance that is used to cool the air inside the electronics enclosure 110 via a change in phase. In a particular embodiment, the phase change material 114 has a latent heat of fusion ranging from 90 kJ/kg to 450 kJ/kg (or more) and a liquid/solid transition temperature of 20° C. to 95° C. A representative example of the phase change material 114 is paraffin wax with a latent heat of fusion in the range of 190-210 kJ/kg, and a liquid/solid transition temperature of 40° C. to 55° C., e.g., 54.5° C. Paraffin wax is generally inexpensive, non-toxic, stable, and is suitable for the expected temperature ranges. In other embodiments, the phase change material can include other materials, for example, eutectics, salt hydrates, and/or fatty acids.

One benefit of using a phase change material in the solar collection structure is that it absorbs a significant amount of heat from the surrounding air when temperatures are high (e.g., daytime), e.g., as sensible and latent heat, and then heat when temperatures are low (e.g., at night), it solidifies. After the phase change material solidifies (e.g., at night), it can be used again to absorb heat as sensible and latent heat when temperatures are high again (e.g., the next time daytime occurs). As shown in FIG. 1, the phase change material 114 is positioned in a plurality of stacked trays 113. Further details of the phase change material 114 and trays 113 are described with reference to FIGS. 2A and 2B.

The electronics enclosure 110 can also include a fan 117 and an air passage 118 extending through a partition 121. The air passage 118 forms part of an airflow path from the first portion 111 to the second portion 112, and the fan 117 can be used to direct air between the first portion 111 and the second portion 112 via the air passage 118. In particular, the fan 117 can be positioned to draw hot air to from the first portion 111 and into the second portion 112. In other embodiments, the partition 121 and/or the fan 117 can be removed (e.g., in cases for which convection and/or other forces are sufficient to direct the air appropriately).

Although FIG. 1 sets forth several embodiments of the solar collection structure 101, several other embodiments of the technology can have configurations and/or components different than those described in this section. For example, PV cells can be used to collect solar energy and output electrical power in addition to or in lieu of the solar concentrators 102, receivers 103, and actuators 104. As another example, the electronics enclosure 110 may not have the first portion 111, the second portion 112, and the partition 121. Rather, in some embodiments, the electronics enclosure 110 may have a single cavity defined by the exterior wall 122 of the electronics enclosure 110 so long as the flow of air can still be controlled to pass sequentially over the phase change material 114 and the electronic components 115. Additionally, in some embodiments, the actuatable components 130-132 can be positioned differently on the electronics enclosure 110 (e.g., on the top, bottom, or side of the electronics enclosure 110). Also, the number of actuatable components can be reduced (e.g., to one door) or increased (e.g., to five or more doors). Furthermore, the position of the electronics enclosure 110 within the solar collection structure may be different (e.g., higher or lower, including below grade). Although not shown in FIG. 1, the electronics enclosure 110 can be positioned at a location inside the solar collection structure that receives less sunlight relative to other locations inside the structure (e.g., in a shaded area, the north side of a structure located in the northern hemisphere, or the south side of a structure located in the southern hemisphere).

Also, although not shown in FIG. 1, the phase change material 114 location can have other locations in other embodiments. In some embodiments, the phase change material 114 can be housed in a separate enclosure connected to the electronics enclosure 110 via an air passageway. In another embodiment, the phase change material 114 can be positioned on a moveable tray or other device that moves the phase change material 114 from one location to another. For example, during the night the phase change material 114 can be moved to the exterior of the electronics enclosure 110 and during the day it can be moved to the interior of the electronics enclosure 110. One benefit of positioning the phase change material 114 in a different location depending on the time of day is that the heat transfer rate can be increased. Conversely, an advantage of keeping the phase change material 114 stationary is that a fixed location is less complex.

Electronics Enclosure

Figure 2A:
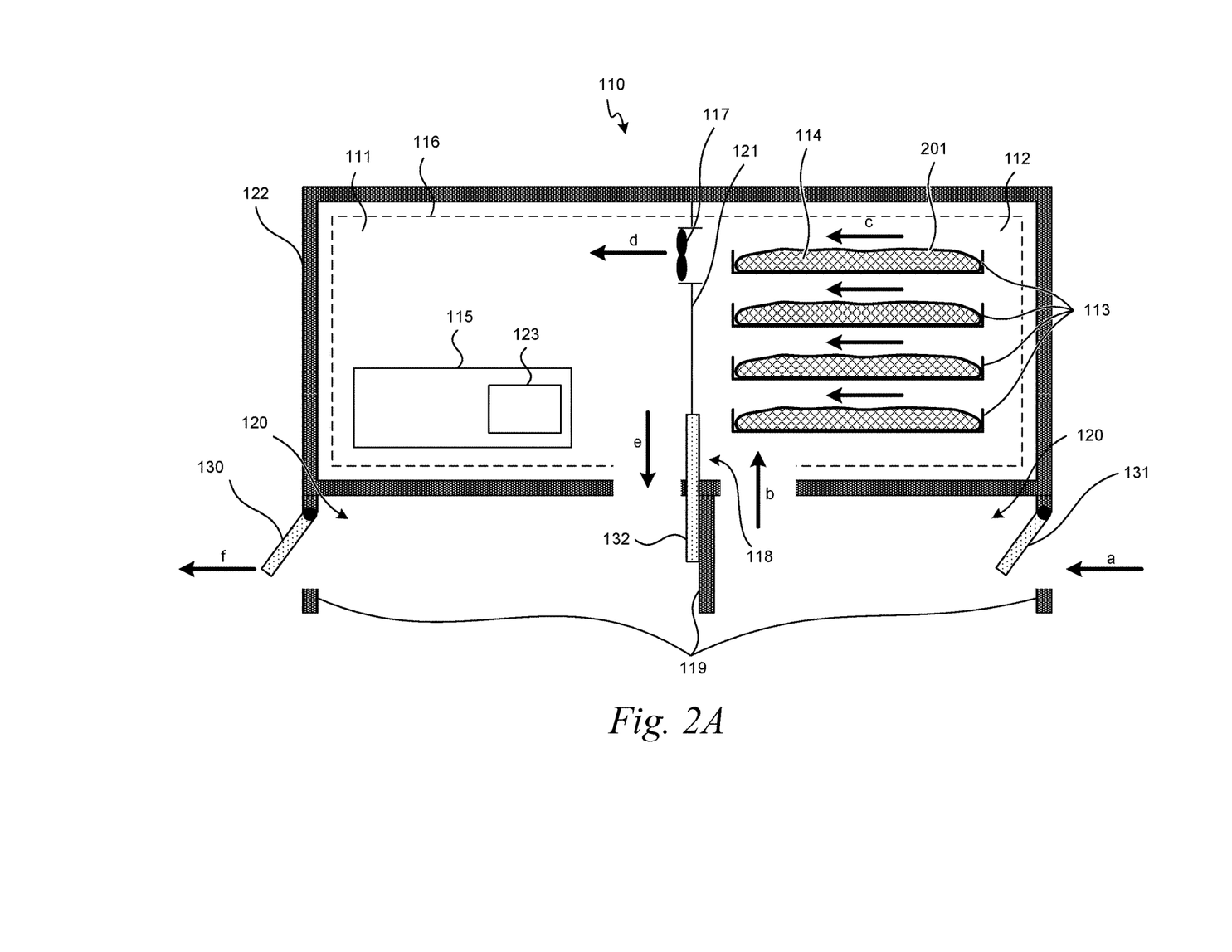
FIGS. 2A and 2B are partially schematic enlarged end views of the electronics enclosure shown in FIG. 1, configured in accordance with embodiments of the present technology.
Figure 2B:
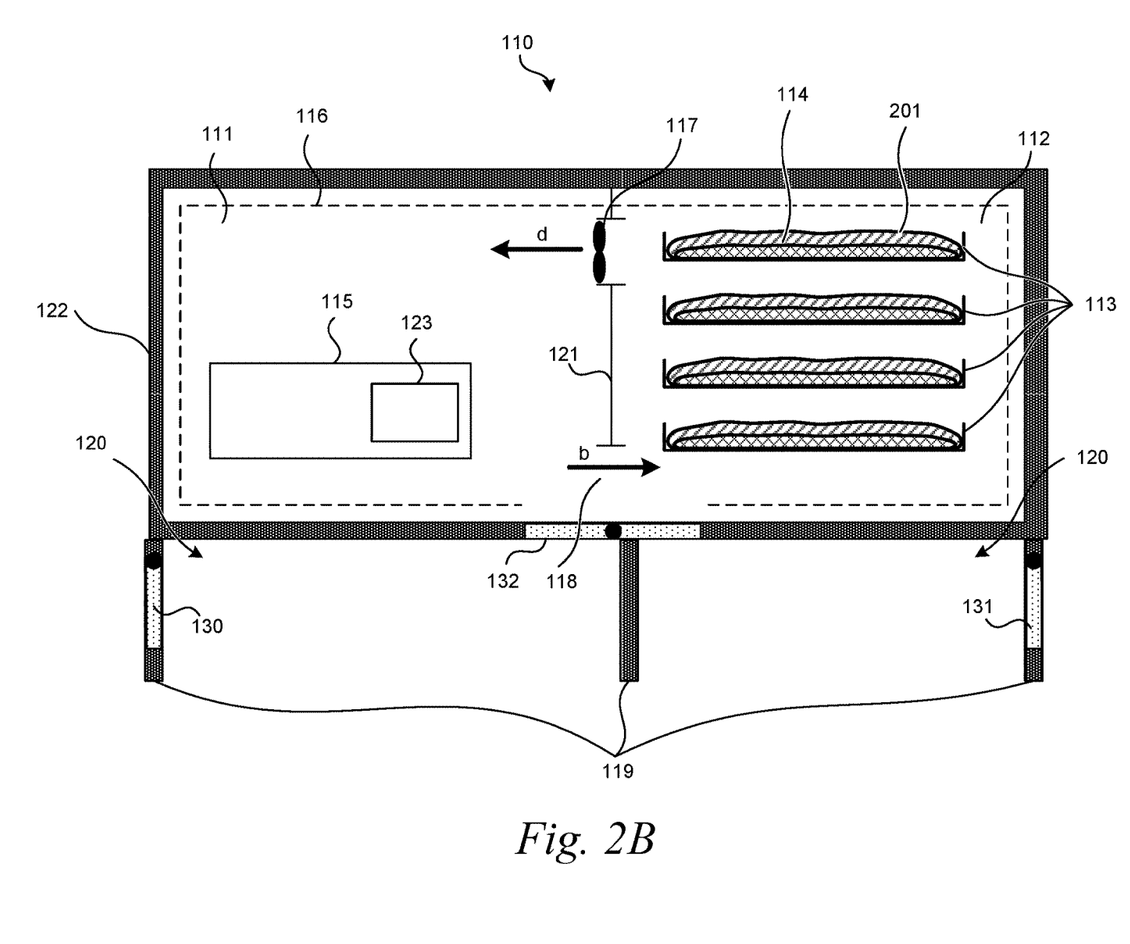

FIGS. 2A and 2B are enlarged, partially schematic end views of the electronics enclosure 110 configured in accordance with embodiments of the present technology. FIG. 2A schematically illustrates the electronics enclosure 110 with the actuatable components 130-132 in an open position configured to increase the flow of air into the electronics enclosure 110. FIG. 2B schematically illustrates the electronics enclosure 110 with the actuatable components 130-132 are in a closed position to reduce or eliminate the flow of air into the electronics enclosure 110. As described in more detail below, the electronics enclosure 110 can be closed during warm periods (e.g., the middle of day) and opened during cool periods (e.g., the middle of the night) to regulate the interior temperature of the enclosure 110.

Referring to FIG. 2A, the actuatable components 130-132 have been positioned to direct air into and out of the enclosure 110 along an airflow path indicated by letters a-f. In particular, first and second actuatable components 130, 131 have been positioned to allow air into and out of the enclosure 110, and a third actuatable component 132 has been positioned to direct the air entering the electronics enclosure 110 to pass over the phase change material 114 before passing over the electronic components 115, in an open loop. The phase change material 114 is in a solid state, as indicated with double hatching marks, as a result of being exposed to the relatively cool flow of air from outside the enclosure 110.

A liquid-tight containment layer 201 (also referred to as a liquid-tight containment element) can be positioned around the phase change material 114, and can be composed of a polymer (e.g., polyurethane, high-density polyethylene, medium-density polyethylene, and/or low-density polyethylene). In a particular embodiment, the containment layer includes a metalized PET with heat sealing layer of PE, (see, e.g., http://sorbentsystems.com/pakvf4c-tubing.html). Other suitable polyethylene compounds are disclosed at http://en.wikipedia.org/wiki/Polyethylene_terephthalate. Still further suitable materials include bi-axially oriented PET film (e.g., Mylar®), which can be aluminized by evaporating a thin film of metal onto it to reduce its permeability, and to make it reflective and opaque (MPET). The containment layer can be rigid (like a box) or flexible (like a bag) depending on the embodiment. When rigid, the containment layer 201 can include metals or other suitable materials. In some embodiments, the liquid-tight containment layer 201 is filled with enough phase change material 114 to produce some tension on the liquid-tight containment layer 201; the layer is not completely filled because the phase change material 114 can expand and contract in volume as its phase changes. The liquid-tight containment layer 201 can have a thickness (e.g., from 5 millimeters to 100 millimeters) suitable to increase its durability, provide suitable thermal exchange with the adjacent air (at a reasonable cost) and lessen the likelihood for the phase change material 114 to spill or spread into the electronics enclosure 110. This latter function is also managed by trays, as described later.

Additionally, the liquid-tight containment layer 201 can function to create a large surface area for thermal contact with the air inside the electronics enclosure 110 when the liquid-tight containment layer 201 is filled with the phase change material 114. For example, the surface area can be significantly larger than the area associated with individuals electronic chips, e.g., in a range from 0.01 $m^2$ to 1 $m^2$. By increasing the surface area of the liquid-tight containment layer 201, the heat transfer rate between the phase change material 114 and the air inside the electronics enclosure 110 can increase. Additionally, maintenance can easily be performed on the phase change material 114 because a technician can simply remove an existing liquid-tight containment layer 201 (e.g., containing a degraded phase change material 114) and replace it with a new liquid-tight containment layer 201 that has been pre-filled with fresh phase change material 114.

The phase change material 114 has chemical and physical properties that facilitate the transfer of heat into the material during a warm period (e.g., the middle of the day) and out of the material during a cool period (e.g., during the night). The chemical and physical properties of the phase change material 114 are selected at least partially based on latent heat, melting point, and thermal conductivity. Latent heat is the amount of energy that causes the material to change its phase, without a corresponding change (e.g., increase) in temperature. In general, a phase change material with a high latent heat (e.g., 100 kJ/kg to 450 kJ/kg) is preferable to a phase change material with a low latent heat (e.g., less than 50 kJ/kg) because the higher latent heat allows more heat to be transferred into the phase change material. When warm air is in thermal contact with the phase change material, the phase change material can melt, and when cool air is in thermal contact with the phase change material, the phase change material can solidify. The phase change material can undergo these cycles many times (e.g., 500 times, 1000 times, 3000 times, 10,000 times, or more), making them particularly suitable for a low-maintenance heat exchange media.

The phase change material 114 is also selected to have an appropriate melting point, e.g., based on the operating temperature of the electronics enclosure 110. If the melting point of the phase change material 114 is above the operating temperature of the electronics enclosure 110, then the phase change material 114 will not change phase during normal operation. As an example, the electronic components 115 may have a recommended maximum operating temperature of 65° C., meaning that the electronic components may malfunction above this temperature. A phase change material 114 with a melting temperature below the recommended operating temperature of 65° C. can be selected such that the phase change material 114 will melt before the recommended operating temperature is reached so as to absorb a significant amount of heat as latent heat. The target temperature for the phase change material 114 can be based on a variety of factors including the temperature range of the environment, the desired operating temperature of the electronic components, the maximum operating temperature of the electronic components, and/or a fail-safe temperature of the electronic components.

In addition to latent heat and melting temperature, the phase change material 114 can have a target thermal conductivity. Thermal conductivity is the rate at which heat passes through a material, typically expressed as the amount of heat that flows per unit time through a unit area with a temperature gradient of one degree per unit distance. In general, the higher the thermal conductivity, the higher the heat transfer rate into the material. As a result, the target thermal conductivity of phase change material 114 is generally selected to be high, e.g., above 0.1 W/mK. Representative examples of suitable phase change materials are paraffins (organic), salt hydrates (inorganic), fatty acids (organic), and/or waxes (e.g., paraffin wax, vegetable wax, and/or combination of waxes). One example of an inexpensive phase change material is paraffin wax, which is suitable for use in a solar structure having an internal temperature exceeding 35° C. Table 1 below lists the properties of suitable representative phase change materials. For example, PCM 1-4 can be used for a solar collection operation in a warm environment (e.g., temperatures above 50° C. in an enclosure). Suitable paraffin wax blends are available from IGI, Inc. of Toronto, Ontario, Canada (www.igiwax.com), and typically include hydrocarbon molecules containing between twenty and forty carbon atoms.

TABLE 1

Phase Change Material (PCM) Properties

|  | PCM 1 | PCM 2 | PCM 3 | PCM 4 |
|---|---|---|---|---|
| Melting Point (° C.) | 53.9 | 50.6 | 54.8 | 54.5 |
| Latent Heat (J/g) | 199.1 | 184.8 | 209.3 | 206.9 |
| Thermal Conductivity (W/mK) | 0.266-0.278 | 0.238-0.243 | 0.257-0.259 | 0.247-0.248 |

As shown in FIG. 2A, the phase change material 114 is positioned in thermal communication with the airflow path, indicated by arrows a-f. When the controller 123 instructs the actuatable components 130-132 to move to the open position, air can flow from the right side (indicated by arrow a) into the air duct 120 and up into the electronics enclosure 110 second portion 112, as shown by arrow b. The airflow path continues up and across the phase change material 114, carried by trays 113. As shown by arrow c, the air is in thermal communication with phase change material 114 when the phase change material 114 is in a liquid state, the air can transfer heat away from the phase change material 114 via conduction and/or convection. This process typically occurs at night to solidify the phase change material 114 (e.g., after the temperature has decreased for a few hours over night). The fan 117 directs the air into the first portion 111 of the electronics enclosure 110, as shown by arrow d. Inside the first portion 111, the air is in thermal communication with electronic components 115. During the night, the electronic components 115 are typically less active than the day, and accordingly may not transfer a significant amount of heat to the air flow. After the heat is transferred into the air, the electronics enclosure 110 directs the air into the air duct 120 (as shown by arrow e) and then out into the interior of the solar collection structure 101 (shown in FIG. 1). As the day progresses, and the temperature of the air drawn into the electronics enclosure 110 via the second actuatable component 131 increases, the phase change material 114 absorbs heat from the air, which causes the phase change material 114 to heat (and possibly begin to liquefy), and cools the electronics components 115. When the temperature of air drawn into the enclosure exceeds a threshold value (e.g., 45° C.), the electronics enclosure 110 is closed, as described below with reference to FIG. 2B.

The controller 123 can be programmed to open and/or close the electronics enclosure 110, e.g., to move the actuatable components 130-132 between at least a first configuration and second configuration to increase or decrease the flow of air into the enclosure. The instructions for moving the actuatable components 130-132 can be based on inputs. Inputs can include time (e.g., time of day), temperature detected in the interior of the enclosure, temperature detected outside the enclosure, forecast temperatures (e.g., based on a weather forecast), sunrise and sunset schedules, and/or related time or temperature parameters. For example, the controller 123 can open or close an actuatable component 130-132 based on time of day (e.g., 8 am), a predetermined interior temperature (e.g., 45° C.) for the solar collection structure 101, and/or after a predefined period of time (e.g., 5 min, 8 hours). In another example, the controller 123 can wait for a 10 minute period to elapse before sending a signal to move the actuatable components 130-132.

FIG. 2B schematically illustrates the electronics enclosure 110 in a closed configuration with the actuatable components 130-132 closed. The closed configuration prevents or significantly restricts the flow of air into the electronics enclosure 110. In a particular embodiment, the actuatable components 130-132 are closed based on an indication a target temperature has been reached or exceeded a target time has been reached or elapsed. The controller 123 instructs the actuatable components 130-132 to move into the closed position, typically during a time when the air outside the enclosure 110 is warm or hot (e.g., mid-day or afternoon). When the actuatable components 130-132 are in a closed position, the airflow path shown by arrows b and d is reduced to a closed loop within the interior of the electronics enclosure 110. In other words, the actuatable components 130-132 in their closed positions reduce (e.g., eliminate) airflow from the exterior into the interior of the electronics enclosure 110. In the closed configuration, the air inside the electronics enclosure 110 is circulated to be in thermal contact with the phase change material 114 and the electronic components 115. As shown in FIG. 2B, the phase change material 114 can melt (as indicated by a single hatching). Depending on the time period and temperature of air that the phase change material is contact with, the phase change material may melt partially, or melt completely.

Continuing with reference to FIG. 2B, the phase change material 114 can continue to store heat when the actuatable components 130-132 are in the closed positions. When the phase change material 114 is in a completely liquid state, it can continue to absorb heat as sensible heat (e.g., without changing state).

Viewing FIGS. 2A and 2B together, the electronics enclosure 110 can be opened to cool its interior during a cooler period of the day (e.g., nighttime) and closed to reduce the increase of temperature of interior of the electronics enclosure during a warmer period (e.g., daytime). When the electronics enclosure 110 is open, relatively cool air from outside the enclosure 110 cools and solidifies the phase change material 114. In this configuration, the air flow can also cool the electronic components 115 at least up to a point. When the doors are closed, the recirculating air continues to cool the electronic components 115 and transfers the heat to the phase change material 114 to liquefy or partially liquefy it.

Figure 3:
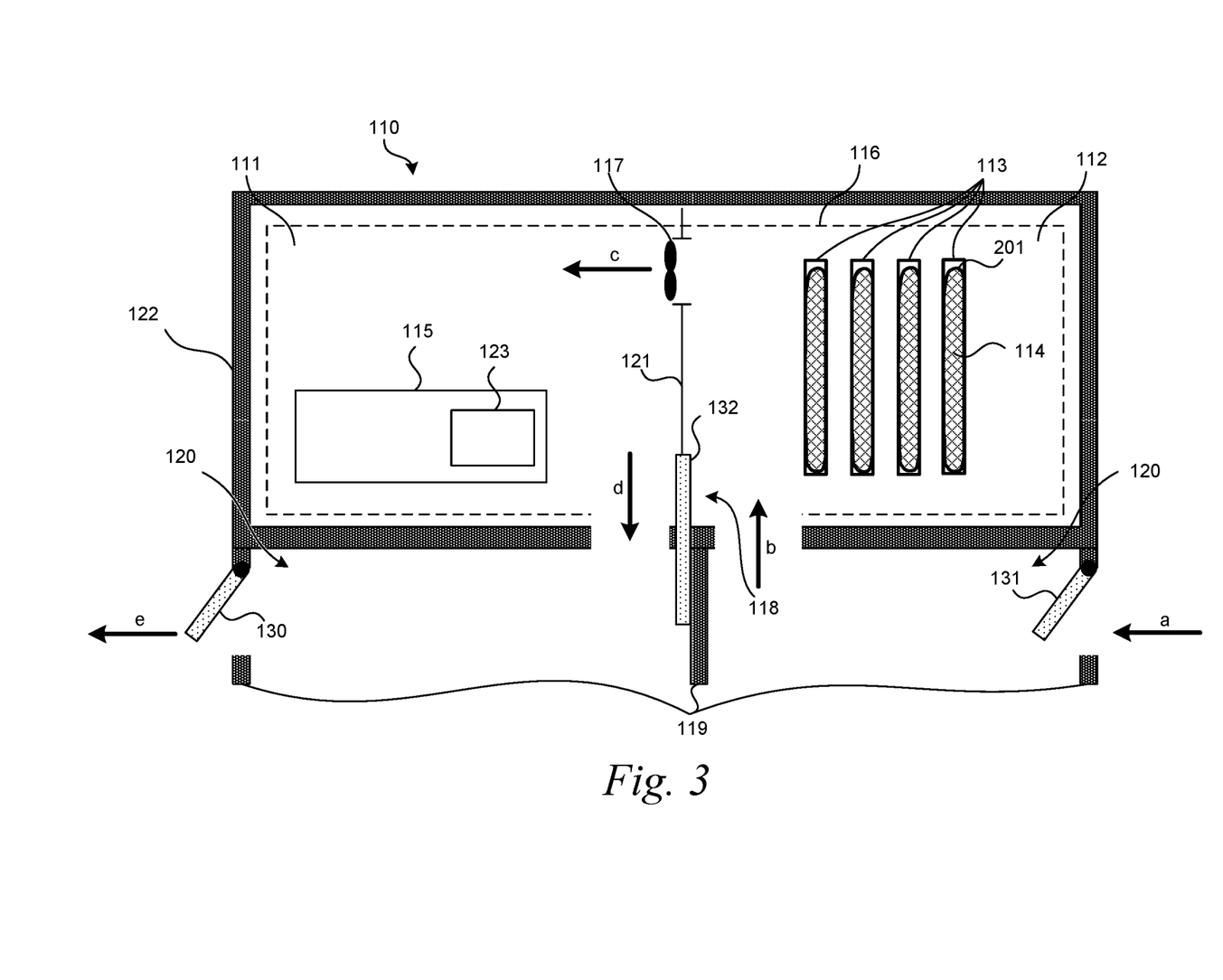
FIG. 3 is a partially schematic end view of an electronics enclosure configured in accordance with further embodiments of the present technology.

FIG. 3 is a partial cross-sectional view of an electronics enclosure 110 configured in accordance with another embodiment of the present technology. FIG. 3 has many of the same elements shown in FIG. 2A, but includes trays 113 and phase change material 114 positioned in a different (e.g., different) orientation. One benefit of arranging the trays 113 in a vertical orientation is that in this orientation, the natural buoyancy of the air as it heats up alongside the phase change material 114 can supplement the fan 117 in driving the flow of air. The trays 113 shown in FIG. 3 also include four walls, as compared to three walls in shown FIGS. 2A and 2B. The fourth wall provides the additional structure to potentially hold the phase change material 114 in a vertical orientation. As the phase change material 114 changes from a solid to a liquid, the liquid tends to accumulate at the bottom of the tray 113 in a pool. The fourth wall can prevent the phase change material 114 from pooling at the bottom of the tray 113.

Figure 4A:
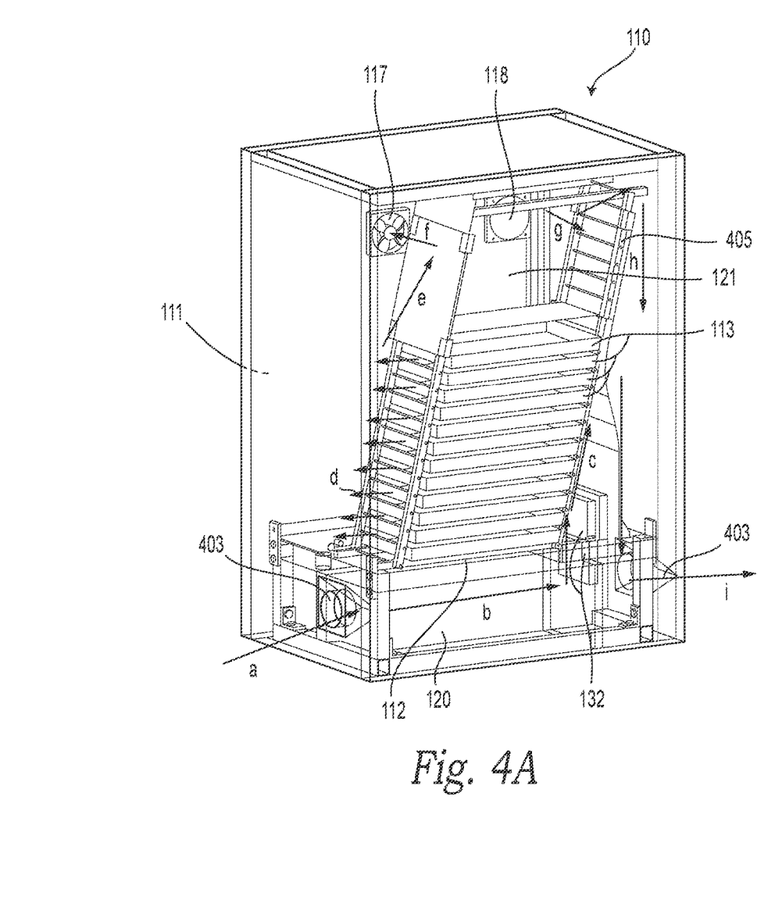
FIG. 4A and FIG. 4B are partially transparent, enlarged isometric views of an electronics enclosure configured in accordance with still further embodiments of the present technology.

FIG. 4A is an enlarged isometric view of portions of an electronics enclosure 110 configured in accordance with embodiments of the present technology. As shown in FIG. 4A, the second portion 112 of the electronics enclosure includes the fan 117, the air passage 118 (in a different position than shown in FIGS. 1, 2A-B, and 3), an air duct 120, trays 113, a partition 121, an actuatable component 132, vents 403, a rack support structure 405, and airflow path indicated by arrows a-i. In general, the vents 403 function in the same manner as the first and second actuatable components 130-131 described above with respect to FIG. 2A. Also, the rack support structure 405 is slanted, which allows the trays 113 to be staggered and provides for an increase in airflow between the trays as compared to a non-slanted rack.

As shown in FIG. 4A, air can travel along the airflow path indicated by arrows a-i to be in thermal contact the phase change material in the trays 113 (not visible in FIG. 4A). The vents 403 are shown in a first (e.g., open) position that allows air to flow into the electronics enclosure 110, e.g., to solidify the phase change material. The fan 117 can direct air from the second portion 112 into the first portion 111 of the electronics enclosure 110 (at the rear of the enclosure 110) to cool the electronic components. The air exits the first portion 111 through the air passage 118 and then exits the electronics enclosure 110 as indicated by arrows h and i without passing over the trays 113.

Figure 4B:
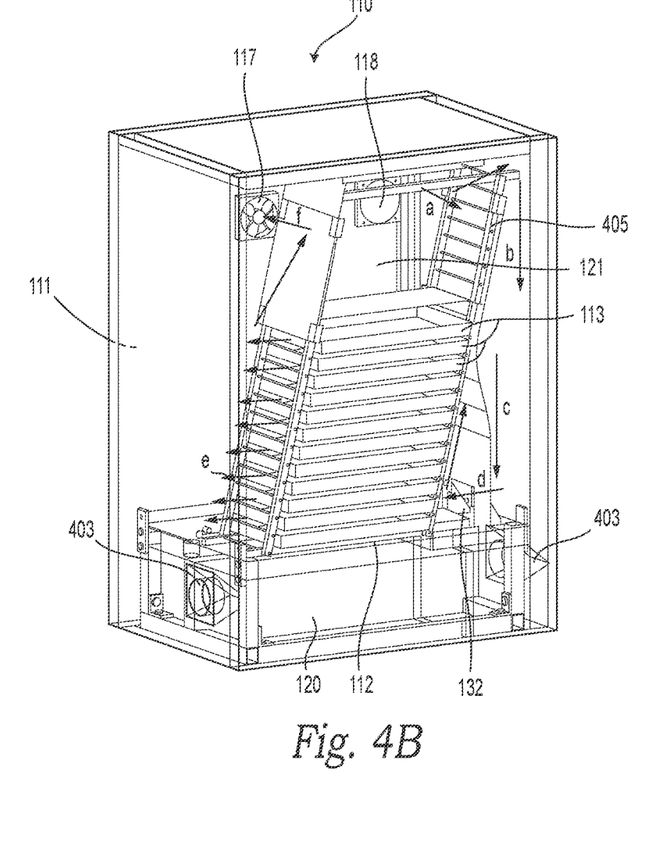

FIG. 4B is an enlarged isometric view of the electronics enclosure 110 of FIG. 4A, shown in the closed position. As shown in FIG. 4B, the vents 403 and actuatable component 132 are in a second (e.g., closed) position that reduces or eliminates the flow of air into the electronics enclosure 110. Accordingly, air circulates in a closed loop over the trays 113 in the second portion 112, then into the first portion 111, and back to the second portion 112. This configuration is typically used during the daytime when exterior temperatures are the highest (e.g., above 30° C.), and the phase change material is used to cool the air, as described above with reference to FIG. 2B.

Figure 5:
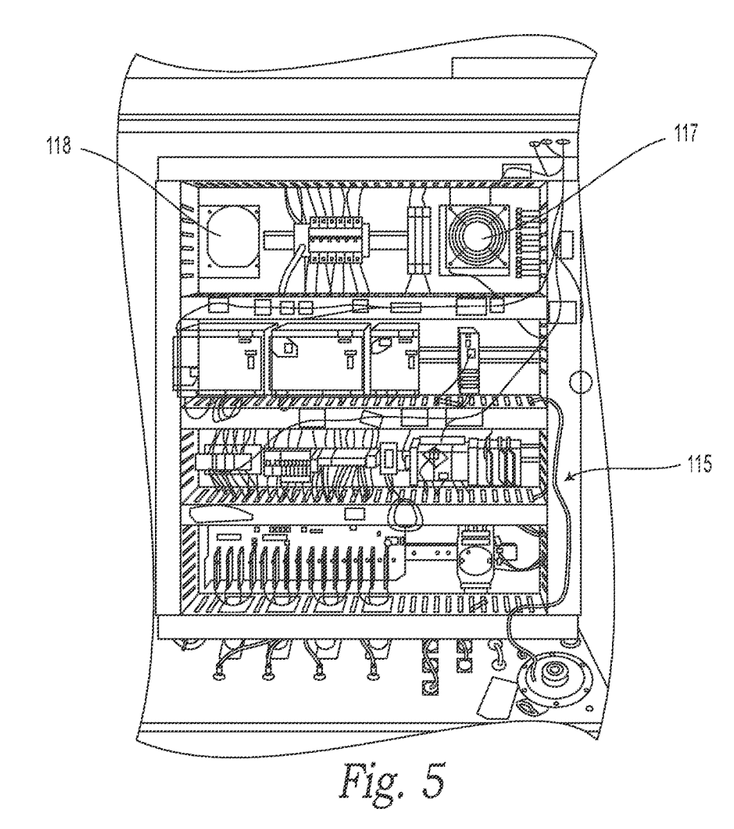
FIG. 5 is an end view of an electronics enclosure configured in accordance with embodiments of the present technology.

FIG. 5 is an end view of a portion of the electronics enclosure 110 shown in FIGS. 4A and 4B. As shown in FIG. 5, the first portion 111 of the electronics enclosure 110 houses electronic components 115 (e.g., wires, electronic panels, memory, and related electronic equipment). Air can enter the first portion 111 via the fan 117, and exits through air passage 118.

Figure 6:
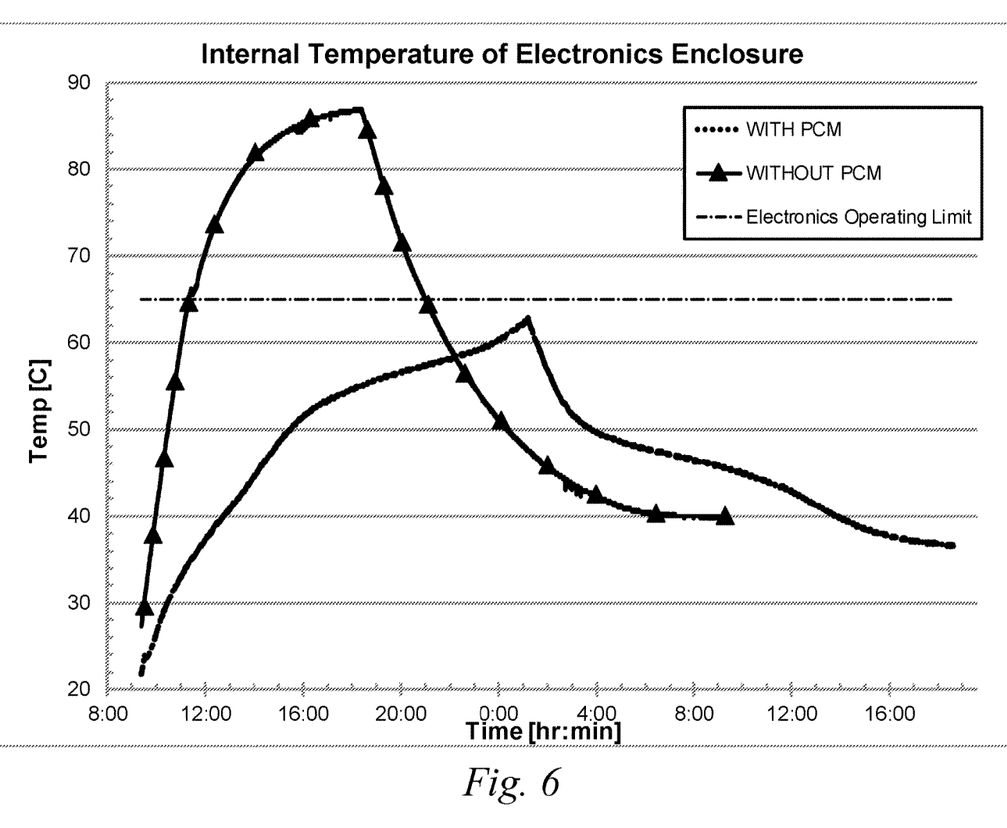
FIG. 6 is a graph illustrating results from simulations of a system configured in accordance with embodiments of the present technology.

FIG. 6 is a graph illustrating results from simulations of a system configured in accordance with embodiments of the present technology. The x-axis represents time in hours and minutes. The y-axis represents the interior temperature of the electronics enclosure. The legend on the upper right side of the graph shows the internal temperature of the electronics enclosure, with and without cooling provided by a phase change material. The legend also includes a recommended operating temperature limit (approximately 65° C.) for electronic components, which can be a target temperature as described above. As seen in FIG. 6, the phase change material significantly reduces the interior temperature of the enclosure by absorbing heat from the electronic components during the day and releasing it during the night. Because the phase change material is absorbing the heat during the warm period (e.g., day time), the air temperature inside the electronics enclosure is reduced, and the electronic components are kept below the recommended operating temperature limit.

As part of the simulation, the temperature exterior to the electronics enclosure was held at 85° C. for approximately 9.5 hours without PCM and 16.25 hours with PCM. After those time periods, the temperature exterior to the electronics enclosure was reduced to 35° C. The door was closed when the exterior was above 45° C. and open when below 45° C. If the test without the PCM had been stopped before the internal temperature reached 65° C. (representative electronics operation limit), then the test would have only lasted about 2 hrs. Therefore, the PCM in this simulation added 14.25 hours of thermal protection for electronic components rated to 65° C.

From the foregoing, it will be appreciated that specific embodiments of the present technology have been described herein for purposes of illustration, but that various modifications may be made without deviating from the disclosed technology. For example, the system can include thermocouples that monitor the interior temperature of the electronics enclosure. If the system determines that the temperature has exceeded a target temperature (e.g., a fail-safe temperature of an electronic component or a recommended maximum operating temperature), the system can shut down the electronic component. For example, PV cells and solar concentrators can be used in conjunction or individually. The airflow paths described above extend between the phase change material and the electronic component, and can also extend beyond either or both. Accordingly, the actuatable components can be between the electronic components and the phase change material, or upstream or downstream of either or both.

Additional embodiments of the present technology can have other arrangements. For example, the ground can be used as a heat sink. By having pipes underground (which remains at relatively stable and relatively low temperatures throughout the day and night), and having fans circulating air into the enclosure and/or the structure, the operator can control the interior temperature without the use of active air conditioning. Such underground pipes can also perform multiple functions, e.g., carrying cabling for powering/communications, as well as cooling electronics enclosures.

Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiples of any item such as A and A; B, B, and C; A, A, B, C, and C; etc.

We claim:

1. A solar energy collection system, comprising:
   an enclosed solar collection structure having a light-transmissive surface;
   a plurality of solar concentrators positioned within the enclosed solar collection structure to receive solar radiation passing into the solar collection structure;
   at least one receiver positioned to receive solar radiation from at least one of the plurality of solar concentrators;
   an electronics enclosure positioned within the solar collection structure;
   an electronic component positioned at least partially within the electronics enclosure;
   a phase change material within the solar collection structure, wherein the phase change material is spaced apart from the electronic component, and wherein the phase change material has a melting point from 20° C. to 95° C.;
   an airflow path positioned between the phase change material and the electronic component;
   an actuatable component in fluid communication with the airflow path and changeable to regulate a flow of air along the airflow path; and
   a controller coupled to the actuatable component to adjust the actuatable component between a first configuration with the actuatable component allowing a first flow of air to pass along the airflow path, and a second configuration with the actuatable component allowing no airflow or a second flow of air less than the first flow of air to pass along the airflow path.

2. The system of claim 1 wherein the melting point of the phase change is between 20° C. and 65° C., wherein the phase change material has a range of latent heat of fusion from 90 kJ/kg to 450 kJ/kg, and wherein the melting point is below a recommended operating temperature for the electronic component.

3. The system of claim 1 wherein the electronics enclosure comprises a first portion including the electronic component and a second portion including the phase change material, and wherein the system further comprises a fan positioned along the airflow path.

4. The system of claim 3, further comprising:
   a plurality of stacked trays wherein the phase change material is positioned in the plurality of stacked trays, wherein at least a portion of the airflow path is positioned between the plurality of stacked trays, and wherein the stacked trays are supported by a slanted support structure.

5. The system of claim 4, further comprising:
   a liquid-tight containment element at least partially surrounding the phase change material.

6. The system of claim 5 wherein the liquid-tight containment element is composed of a material with thermal conductivity greater than 0.05 W/mK, and has at least 0.1 square meters of surface area.

7. The system of claim 1 wherein the electronic component is operatively coupled to an actuator to control at least one of the plurality of solar concentrators.

8. The system of claim 1 wherein the melting point of the phase change material is below at least one of: a maximum operating temperature, a shutdown temperature, or a fail-safe temperature of the electronic component.

9. The system of claim 1 wherein the phase change material is inside the electronics enclosure.

10. The system of claim 1 wherein the phase change material is outside the electronics enclosure.

* * * * *

UNITED STATES PATENT AND TRADEMARK OFFICE
CERTIFICATE OF CORRECTION

PATENT NO. : 10,063,186 B2  
APPLICATION NO. : 15/197177  
DATED : August 28, 2018  
INVENTOR(S) : Dylan Miller Fairbanks et al.

Page 1 of 1

It is certified that error appears in the above-identified patent and that said Letters Patent is hereby corrected as shown below:

On the Title Page

On the page 3, in Column 2, item (56), under "Other Publications", Line 22, delete "of manufacturing" and insert -- of_manufacturing --, therefor.

On the page 3, in Column 2, item (56), under "Other Publications", Line 29, delete "/askascl/" and insert -- /askasci/ --, therefor.

In the Specification

In Column 8, Line 4, delete "http://" and insert -- https:// --, therefor.

Signed and Sealed this  
Eighth Day of January, 2019

Andrei Iancu  
*Director of the United States Patent and Trademark Office*